(No Model.)
H. C. KRING.
DEVICE FOR CONVERTING MOTION.
No. 321,371. Patented June 30, 1885.
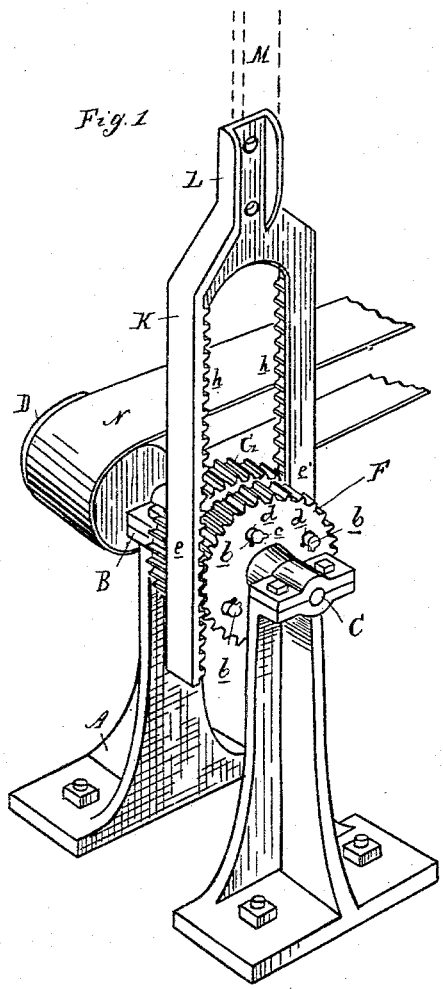
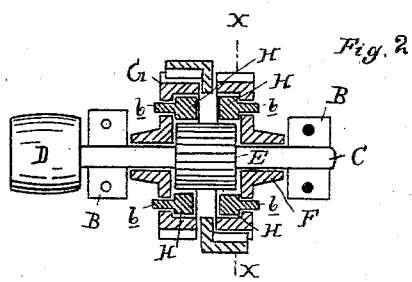
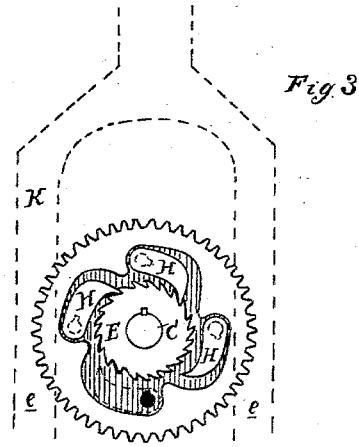
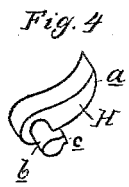
Attest:
John Schuman.
Inventor:
Henry C. Kring
by his Att'y

UNITED STATES PATENT OFFICE.

HENRY C. KRING, OF MONROE, MICHIGAN.

DEVICE FOR CONVERTING MOTION.

SPECIFICATION forming part of Letters Patent No. 321,371, dated June 30, 1885.

Application filed April 29, 1885. (No model.)

*To all whom it may concern:*

Be it known that I, HENRY C. KRING, of Monroe, in the county of Monroe and State of Michigan, have invented new and useful Improvements in Attachments to Wind-Engines; and I do hereby declare that the following is a full, clear, and exact description thereof, reference being had to the accompanying drawings, which form a part of this specification.

This invention relates to certain new and useful improvements in the construction and operation of a device adapted to be attached to the reciprocating pump-rod of a windmill and convert such reciprocating motion to a rotary motion of a shaft having a suitable pulley secured thereon, so that by means of a suitable belt running over such pulley such rotary motion can be communicated to other mechanism which it may be desired to drive, the power being derived from the windmill.

The invention consists in the peculiar construction of the various parts and their combinations and operation, as more fully hereinafter described.

Figure 1 is a perspective view of my device as attached and in operation. Fig. 2 is a vertical section taken through the axis of the shaft, showing the arrangement of the parts connected with such shaft. Fig. 3 is a vertical cross-section on the line $x$ $x$ in Fig. 2, and Fig. 4 is a detached perspective view of one of the pawls.

In the drawings, A A represent the legs of a suitable standard, to the upper end of which are fitted the boxes B, which carry the shaft C, upon the overhanging end of which is fitted the pulley D. Centrally of the shaft, between the boxes, is located and secured the ratchet-wheel E, and sleeved upon the shaft are the tooth-pinions F and G. The inner faces of these tooth-pinions F and G are recessed to embrace the ends of the ratchet-wheel E and give room for the pawls H to operate. These pinions are each provided with a suitable number of these pawls H, which are simply dogs $a$, secured to trunnions $b$, having a feather, $c$, such trunnions with their feathers being inserted through proper openings, $d$, in such pinions, leaving the dogs themselves to operate within the recess formed in the inner faces of the wheels and engage with the ratchet E, such pawls in the opposite wheels pointing in different directions, so that as the tooth-pinions are partially rotated in opposite directions alternately a rotary motion will be communicated to the shaft C. In order to operate these pinions in this manner I construct the yoke K with two vertical arms, $e$ and $e'$, the inner faces of which are provided with rack-teeth $h$, so constructed and arranged that the rack-teeth upon one of these arms will engage with one of the tooth-pinions, and the rack-teeth on the opposite arms engage with the opposite tooth-pinion. Such yoke is provided with a head, L, or other suitable devices, by means of which it can be attached to the rod M, which rod has a reciprocating motion derived from the windmill mechanism (not shown) of the usual construction.

A belt, N, running over the pulley D and connecting with a pulley upon the shaft of a grindstone or other suitable mechanism desired to be driven communicates the rotary motion of said shaft to such mechanism.

It will be noticed that at each reciprocating motion of the pump-rod M a like motion is communicated to the yoke K, which, through its racks engaging with the tooth-pinions, communicates an opposite rotary motion to these pinions, and through the pawls carried by these pinions a continuous rotary motion is communicated to the shaft C by means of the engagement of such pawls with the rack E.

What I claim as my invention is—

1. In a device for the purpose described, a yoke having means for attachment to a reciprocating rod, and having parallel arms fitted with rack-teeth upon their inner faces, in combination with a pair of toothed pinions sleeved side by side upon a shaft, substantially as set forth.

2. In a device for the purpose described, a yoke having means for attachment to a reciprocating rod, and having parallel arms fitted with rack-teeth upon their inner faces, and a pair of toothed pinions sleeved side by side upon a shaft, in combination with a rack-pinion secured to said shaft between said toothed pinions, and pawls pivotally secured to said toothed pinions and engaging with said rack-pinion, substantially as specified.

3. In a device for the purpose described, the toothed pinions F G, recessed upon their inner faces and sleeved upon a shaft side by side, and embracing a rack-pinion secured between them upon the same shaft, and provided with pivoted pawls to engage with said rack-pinion, in combination with a double rack, K, constructed substantially as specified, and for the purposes set forth.

4. A device for the purpose described, consisting of a shaft, C, suitably journaled in bearings B, two toothed pinions, F G, sleeved upon said shaft and carrying pawls H, a rack-pinion, E, secured upon said shaft between said toothed pinions F G and a rack-yoke, K, the parts being constructed, combined, and operating substantially as and for the purposes specified.

HENRY C. KRING.

Witnesses:
H. S. SPRAGUE,
CHARLES J. HUNT.